US012076955B2

(12) United States Patent
Espe

(10) Patent No.: US 12,076,955 B2
(45) Date of Patent: Sep. 3, 2024

(54) PRESS PAD

(71) Applicant: HUECK Rheinische GmbH, Viersen (DE)

(72) Inventor: Rolf Espe, Bochum (DE)

(73) Assignee: HUECK Rheinische GmbH, Viersen (DE)

( * ) Notice: Subject to any disclaimer, the term of this patent is extended or adjusted under 35 U.S.C. 154(b) by 436 days.

(21) Appl. No.: 17/378,692

(22) Filed: Jul. 17, 2021

(65) Prior Publication Data

US 2022/0001636 A1 Jan. 6, 2022

Related U.S. Application Data

(63) Continuation of application No. PCT/EP2020/054156, filed on Feb. 18, 2020.

(30) Foreign Application Priority Data

Feb. 20, 2019 (DE) .................... DE202019000828.4

(51) Int. Cl.
*B32B 41/00* (2006.01)
*B30B 15/06* (2006.01)
*D03D 1/00* (2006.01)

(52) U.S. Cl.
CPC ............. *B30B 15/061* (2013.01); *D03D 1/00* (2013.01); *D10B 2101/20* (2013.01)

(58) Field of Classification Search
CPC ...... B30B 15/061; B30B 15/064; D03D 1/00; D10B 2101/20; B27N 3/18; B27N 7/005; B27N 3/203
USPC .................... 156/60, 64, 350, 351, 378, 379
See application file for complete search history.

(56) References Cited

U.S. PATENT DOCUMENTS

| | | | |
|---|---|---|---|
| 3,980,016 A | 9/1976 | Taylor | |
| 2018/0236740 A1* | 8/2018 | Espe | B30B 15/064 |

FOREIGN PATENT DOCUMENTS

| | | | | |
|---|---|---|---|---|
| DE | 2402931 A1 | 7/1974 | | |
| DE | 2319593 A | 11/1974 | | |
| DE | 20011432 U | 10/2000 | | |
| DE | 10032253 A1 | 2/2001 | | |
| DE | 20115945 U1 | 3/2003 | | |
| DE | 60019863 T2 | 11/2005 | | |
| DE | 202012005265 U | 6/2012 | | |
| EP | 0488071 A2 | 6/1992 | | |
| EP | 0493630 A1 | 7/1992 | | |
| EP | 0735949 A1 | 10/1996 | | |
| EP | 1136248 | 3/2001 | | |
| EP | 1300235 A | 4/2003 | | |
| GB | 1249825 A | 10/1971 | | |
| JP | S49109972 A | 10/1974 | | |
| JP | H05138675 A | 6/1993 | | |
| RU | 2575231 C2 | 2/2016 | | |
| RU | 2574175 C2 | 10/2016 | | |
| SU | 2235642 C2 | 7/1976 | | |
| WO | WO-2017055535 A1 * | 4/2017 | | B30B 15/061 |

* cited by examiner

*Primary Examiner* — Michael N Orlando
*Assistant Examiner* — Joshel Rivera
(74) *Attorney, Agent, or Firm* — Von Rohrscheidt Patents

(57) ABSTRACT

A press pad for a hydraulic single or multi-level hot press, the press pad including a flat support structure; and a plurality of metal spring elements connected with the flat support structure and arranged distributed therein or thereon.

10 Claims, 7 Drawing Sheets

PRESS PAD

RELATED APPLICATIONS

This application is a continuation of International Application PCT/EP2020/054156 filed on Feb. 18, 2020 claiming priority from German Patent Application filed on Feb. 20, 2019, both of which are incorporated in their entirety by this by this reference.

FIELD OF THE INVENTION

The invention relates to a press pad for a hydraulic single or multi-level hot press. The invention also relates to a press pad—press plate unit and a press pad—heating plate unit.

BACKGROUND OF THE INVENTION

Coating wood material sheets like e.g., plywood, particle board, MDF, HDF, or multiplex plates is typically performed with high alpha pulp papers that are impregnated with amino resin. The papers can be imprinted with various designs or they can be provided in a single color. The amino resins are made from pre-condensed melamine-/formaldehyde resins or also from mixed resins made from melamine and urea or phenol and cresol. The pre-condensed resins are in a liquid phase so that the paper webs are impregnated well on special impregnating channels with drying and cooling zones. In the heated drying zone, the poly-condensation of the resins is excited again at a temperature between 150 degrees C. and 170 degrees C. and interrupted in a downstream cooling zone depending on the desired degree of condensation. The paper webs thus obtained have low water content and are firm and therefore transportable for further processing in a press plant, in particular in a hydraulic single level or multilevel hot press.

The impregnated decor papers are being used with the accordingly selected wood material plates in a hydraulic hot press which can have a single level or multiple levels. Under pressure and temperature, the pre-condensed amino resins are liquefied wherein the viscosity of the liquid resins increases again through the additional molecule cross linking so that a solid surface is formed eventually. In order to form the surface metal press plates are brought in contact with structured matte or glossy surfaces with the décor papers or the amino resins. The press plates are typically chrome plated in order to protect the surface against abrasion and damages. The chrome layer furthermore provides easy separation from the resin layer after coating. Metal press plates can be made e.g., from brass, the alloy MS64, or the materials ASI410 or ASI630, wherein steel plates are being preferred these days due to their higher hardness and longer service life.

Depending on the application the wood material sheets have different raw densities and therefore also require different pressing pressures. When producing flooring plates made from HDF material (high density fibreboard) the specific pressing pressures are particularly high and in the range of 400 $N/cm^2$ to 600 $N/cm^2$ since the raw densities of the plates are between 800 $N/cm^3$ to 1000 $N/cm^3$. The raw plates themselves have a very small cushioning affect and thus have thickness tolerances that have to be compensated during the coating process. As a matter of principle all plate materials have larger or smaller thickness tolerances. Additional tolerances can result from the respective press plant itself, in particular the press plates and heating plates included therein.

If the recited tolerances are not compensated considerable surface voids are created when forming the surfaces of the coated wood material sheets. Therefore, the press plants are configured as a matter of principle with corresponding press pads, in particular configured as pressure balancing fabrics or mats. The press pads are fixed between the heating plates and the press plates. The press pads have to be temperature stable, this means they must not decompose at temperatures between 200° C. and 230° C. and they have to have good spring elasticity or reset force and high heat conductivity. The uniform pressure distribution and the quick heat transfer during the coating process are thus particularly important factors. As recited supra the amino resin is liquefied again under pressure and temperature wherein formaldehyde and water are precipitated in a vapor phase. Since the resin is between the metal press plate and the wood material sheet the system is not closed air tight and the vapors have to permeate into the paper web and the sheet surface during a short time period that determines the cycle time of the press plant. When this does not happen because the pressing pressure is uneven gas bubbles remain enclosed in the resin layer and are visible thereafter in the surface as milky and cloudy spots. Sheets with these types of voids are then not suitable anymore for further processing. Due to the high heating plate temperatures of 200 degrees C. to 230 degrees C. the choice of suitable materials for the press pads is limited. In the last decades an elastomeric material that is based on silicone rubber has proven suitable, wherein also blended materials and copolymers from silicone rubber and floor silicone rubber or fluor rubber are being used. The prior art press pads are typically configured as fabrics with threads that include elastomeric material or as coated mats with an inner, typically metal support fabric.

EP 1 136 248 A discloses a press pad that includes a fabric that includes a copolymer made from a silicon and a flor silicon rubber. The copolymer is woven into the fabric in a form of coated threads that are used as warp threads and weft threads. In order to improve heat conductivity metal additives can be added to the elastomeric materials.

EP 0 735 949 A1 describes a press pad that includes a silicon elastomeric material in one thread system and metal threads in another thread system. The threads that include the silicon elastomeric materials can be configured as jacket or core threads wherein e.g., the thread core is made from wire material and the thread jacket is made from the silicon elastomeric material.

In the press pad disclosed by DE 20 2012 005 265 U particular threads are configured as heat conducting threads that are engineered to facilitate direct heat transfer due to their extension being perpendicular to the press pad surfaces.

Furthermore, EP 1 300 235 A and DE 23 19 593 A respectively discloses a press pad made from metal fabric which is subsequently coated with a silicone rubber essentially on its entire surface. According to the teachings of EP 1 300 235 A the metal threads that are oriented towards a surface of the press pad, in particular its loops are exposed during blade coating in order to achieve a metal contact between the press pad and the heating plate or the press plate. Additionally, particles can be mixed into the silicone elastomeric material in order to increase heat conductivity. It is a disadvantage in this context that elasticity and reset properties of the elastomeric material matrix are degraded by adding the particle shaped additives.

Frequently the known press pads suffer from material fatigue, in particular with respect to their reset force or spring elasticity. The known silicone elastomeric materials but also alternatively used press pads with threads made from aromatic polymers, in particular polyamides go through a degradation processes when exposed to permanent temperatures above 200 degrees C. to 230 degrees C. Therefore, the press pads have to be replaced rather early which causes a shutdown of the press plant and increased environmental impact in particular since the press pads that are made from the known materials or material mixes cannot be recycled easily. In particular for coating flooring material plates press pads are required which have high reset properties over a long service life and very high thermal conductivity. Prior art press pads do not allow a plate format change when coating laminated HDF flooring material plates since the pads are compressed strongly in the selected plate format and a subsequent change to a larger format leaves markings on the material to be pressed.

Additionally, press pads according to the invention can also be used in so-called high-pressure press plants where e.g., so-called high-pressure laminates e.g., configured as base materials for circuit boards are produced by pressing under heat impact. A press pad for this application that is made from a high temperature resistant synthetic material fleece and a PTFE foil that is glued together therewith is known from DE 200 11 432 U. Due to the long cycle times during these pressing processes metals are not required for this high-pressure pad.

BRIEF SUMMARY OF THE INVENTION

Thus, it is an object of the invention to provide a press pad that is characterized by very high elastic reset properties, that does not show any fatigue over a long time period and that provides a large amount of heat conductivity.

The object is achieved by a press pad for a hydraulic single or multi-level hot press, the press pad including a flat support structure; and a plurality of metal spring elements connected with the flat support structure and arranged distributed therein or thereon.

Metal spring elements have two advantages over elastomeric materials or aromatic polymathic materials. On the one hand side they can have a very high elasticity modulus due to the metal material. This means a high spring constant. This means that the reset forces are already very large for comparatively small deflections, this means deformations of the spring elements are already very large. Metals with a high elasticity modulus and a large amount of elongation at fracture are e.g., steel, in particular spring steel. As a matter of principle also other metal materials like e.g., copper alloys, e.g., beryllium copper can be used. In spite of the large spring constants metal springs retain their reset properties over a very long time period so that the press pads according to the invention have a rather long service life. On the other hand, side metal spring elements have very good heat transfer properties so that heat transfer through the press pad according to the invention is positively influenced compared to press pads that include a high portion of an elastomeric material that is characterized by rather inferior heat transfer properties.

Thus, the invention facilitates for the first time using a press pad component which is equally advantageous with respect to heat transfer properties as well as with respect to spring elasticity and reset properties. In the prior art always, different components were used to optimize both properties e.g., heat conductivity and reset properties, thus e.g., elastomeric materials for reset properties and metal materials in particular metal threads for good thermal conductivity. According to the invention the support structure can be formed by a metal plate, advantageously a press plate or a heat plate of the single or multilevel hot press. In both cases of connecting the spring elements with a press plate or a heat plate a respective unit of press plate and spring elements or heat plate and spring elements is provided. Advantageously the spring elements are glued together with the respective plate and/or soldered together and/or welded together or connected by form locking, e.g., by inserting spring sections into corresponding recesses or cutouts in the plate.

As an alternative to a support structure configured as a plate a support structure configured as a flat contexture can also be used. In particular the flat contexture can be a woven or knitted material or a fleece material or fabric wherein at least a portion of the threads that form the flat contexture are made from metal or include metal wherein the metal can be in particular brass, copper, bronze, steel, in particular stainless steel.

Additionally, a combination of a metal plate and a flat contexture can be used to form the support structure. Advantageously the spring elements are connected with the flat contexture in this embodiment and/or with the metal plate. Additionally, a suitable connection is required between the flat contexture and the metal plate, e.g., configured as a glue joint, a weld or a solder joint or a form locking connection between threads of the flat contexture and the plate, e.g., running threads of the flat contexture through cut outs or recesses in the metal plate.

For metal spring elements advantageously disc springs or coil springs or leaf springs or corrugated springs can be used.

According to an advantageous embodiment of the invention it is proposed to connect the spring elements with the threads of the flat contexture, in particular by form locking, thus advantageously at intersection points of warp threads and weft threads. For this purpose, the spring elements can have cut outs wherein threads of the flat contexture, in particular the recited warp threads and weft threads are run through the cut outs. A particularly advantageous embodiment is formed by a press pad where the spring elements have four cut outs respectively wherein a warp thread is run through two cut outs and a weft thread is run through the other two cut outs. The intersections of the respective threads can thus be configured in a particularly advantageous manner.

In order to achieve good homogeneity of the spring properties of the press pad the spring elements shall be arranged equidistant from one another, in particular in intersecting rows, furthermore in particular along the weft threads and/or warp threads of a fabric forming a support structure. This yields a matrix structure and a particularly simple arrangement of the spring elements.

In another advantageous embodiment the spring elements are partially embedded in an elastomeric material, advantageously a silicon elastomeric material or a blend polymer or copolymer of the two recited elastomeric materials. Advantageously sections or portions of the spring elements form a respective portion of the surface of the press pad at both opposite sides of the press pad. This achieves particularly good heat transfer since the transfer of heat at both surfaces of the press pad is provided by metal contact surfaces of the press pad with the press plate or the heating plate. It is particularly advantageous in this context when the spring elements extend over an entire thickness of the press pad and through the press pad in order to optimize heat transfer.

When metal spring elements are used in combination with an elastomeric material it can be useful to add particles to the elastomeric material that increase a heat conductivity of the press pad. These are in particular particles made from a metal or a mineral wherein these particles are advantageously configured as nano particles.

BRIEF DESCRIPTION OF THE DRAWINGS

The invention is now described based on advantageous embodiments with reference to drawing figures, wherein.

DETAILED DESCRIPTION OF THE INVENTION

Figure 1:
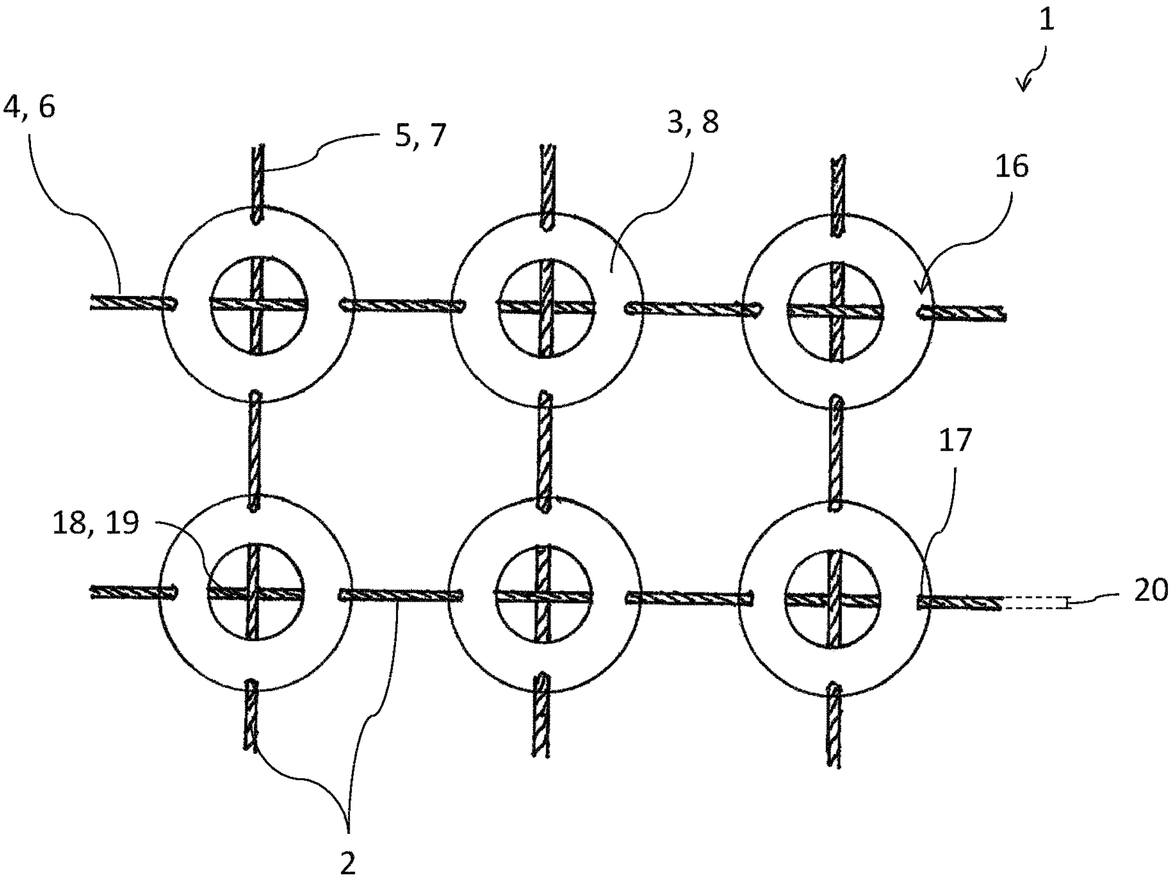
FIG. 1 illustrates a schematic view of a press pad according to the invention.

An embodiment illustrated in FIG. 1 includes a press pad 1' according to the invention for application in a hydraulic single level or multi-level hot press. elastomeric material it can be useful advantageous. Similar to the prior art, the press pad 1 is arranged between a heating plate and a press plate of a single level or multi-level hot press in order to compensate for thickness tolerances in the press plate or the heating plate and in order to simultaneously facilitate a transfer of heat from the heating plate to the press plate.

The press pad 1 according to the invention includes a flat support structure 2 and a plurality of spring elements 3. The flat support structure 2 is configured as a fabric that includes two thread systems 4, 5 namely warp threads 6 and weft threads 7. The warp threads 6 as well and the weft threads 7 are configured as brass wire strands and are woven together in a plain weave. Thus, the warp threads 6 run in an alternating pattern above and below the weft threads 7 and vice versa.

The spring element 3 of the press pad 1 are configured as metal disc springs 8. When used in a single level or multilevel hot press the disc spring 8 in a non-deformed condition only contacts a circular circumferential upper edge 9 at a heating plate of a single level or multi-level hot press and at a circular circumferential lower edge 10 at a press plate of a single or multi-level heating press, wherein the two edges 9, 10 respectively form a circular contact line 11, 12. A reversed orientation of the spring element 3 is also conceivable where the upper edge 9 is in contact with the press plate and the lower edge 10 is in contact with the heating plate.

Figure 2:
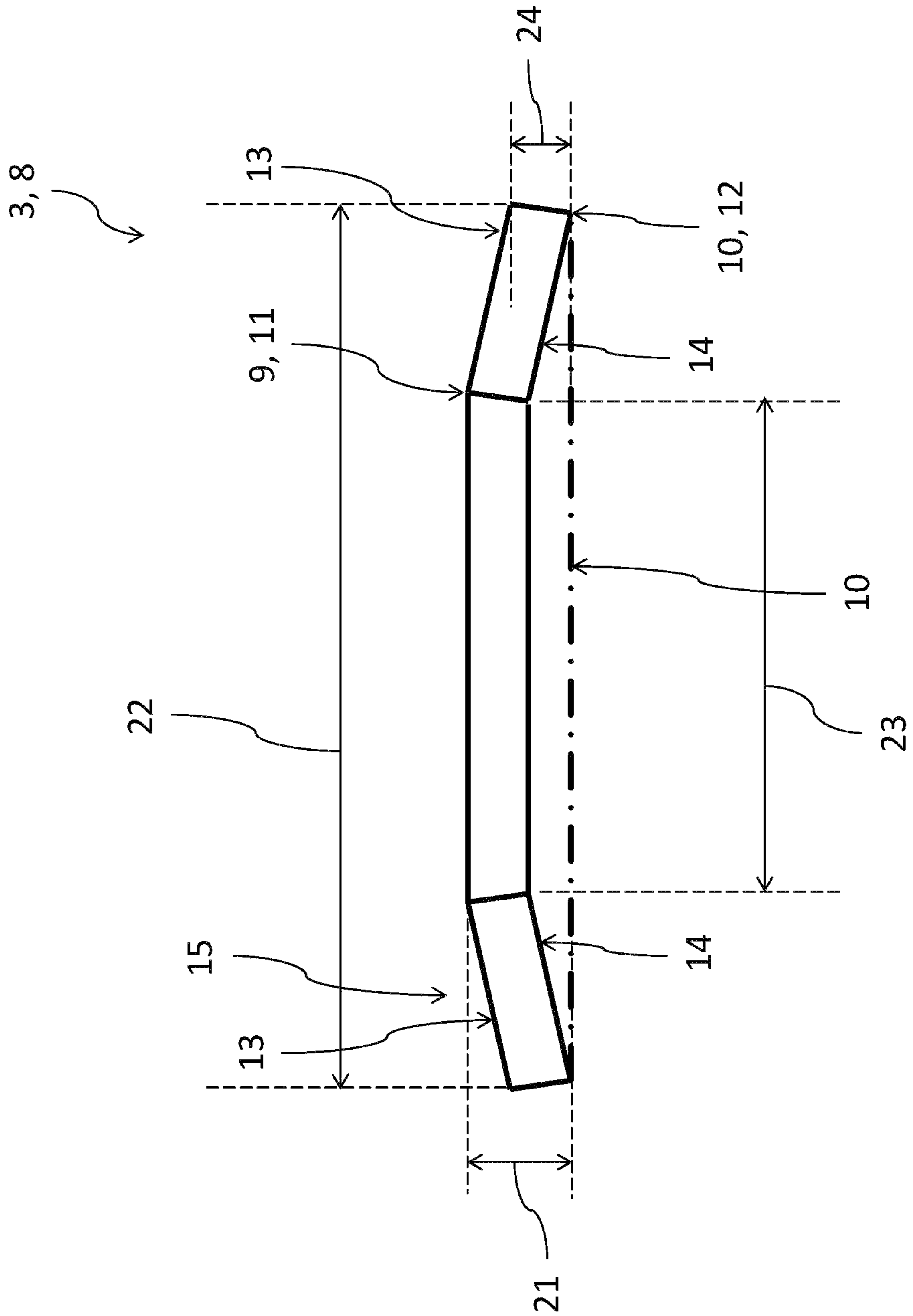
FIG. 2 illustrates a vertical sectional view through a spring element according to FIG. 1.

Furthermore, the disc springs 8 have beveled conical side sections 15 which cause a reduction of a diameter of the first contact line 11 relative to a diameter of the second contact line 12. A sectional view of the disc spring 8 is shown in FIG. 2 and emphasizes a frustum shape.

During a pressing process in a single level or multilevel hot press the spring element 3 is deformed so that a flat upper contact surface 13 is formed. Simultaneously a flat lower contact surface 14 is formed. Thus, one of the contact surfaces 13, 14 is in contact with the heating plate when used in a single level or multilevel hot press, whereas the other contact surface 13, 14 is in contact with the press plate. Thus, the disc spring 8 essentially assumes a shape of a hollow cylinder during the pressing process.

The disc springs 8 include four cut outs 17 in an edge portion 16 wherein the cut outs are respectively arranged at an angle of 90 degrees relative to each other and can be open towards a circular outer edge of the disc spring 8 in order to simplify fabrication in order not to have to thread the weft threads 7 or the warp threads 6 through with a thread end but to be able to laterally thread in the weft threads 7 or warp threads 6. A respective thread 6, 7 of a thread system 4, 5 is run through two opposite cut outs 17 of the spring elements 3 while the remaining two cut outs 17 are provided to receive a thread 6, 7 of the other corresponding thread system 4, 5. An intersection point 18 of a warp thread 6 and a weft thread 7 thus essentially corresponds to a center axis 19 of the spring element 3. The disc springs 8 are arranged in the press pad 1 in an equidistant pattern and form rows in the press pad 1 that intersect at an angle of 90 degrees. Thus, the press pad 1 can be rolled up and transported in a simple manner.

Due to an unloaded force free length 21 of the disc springs 8 that is increased over a diameter 20 of the warp threads 6 and weft threads 7 an upper contact surface of the press pad 1 is formed by an entirety of the upper contact surfaces 9 of the individual disc spring 8 whereas a lower contact surface of the press pad 1' is defined by an entirety of the lower contact surfaces 10 of the individual disc springs 8. This assures that different thicknesses in the heating plate and/or the press plate are compensated by the spring effect of the disc springs 8, wherein the spring effect can be adjusted by adjusting an outer diameter 22, an inner diameter 23, a material thickness 24 and an unloaded length 21 of the disc spring 8 in order to meet the particular requirements of the single of multilevel hot press. The warp threads 6 and the weft threads 7, thus do not come in contact with the press plate or the heating plate. Due to the heat conducting properties of the disc springs 8 which extend through the press plat in a very direct and short path good heat transfer is provided from the heating plate to the press plate.

Figure 3:
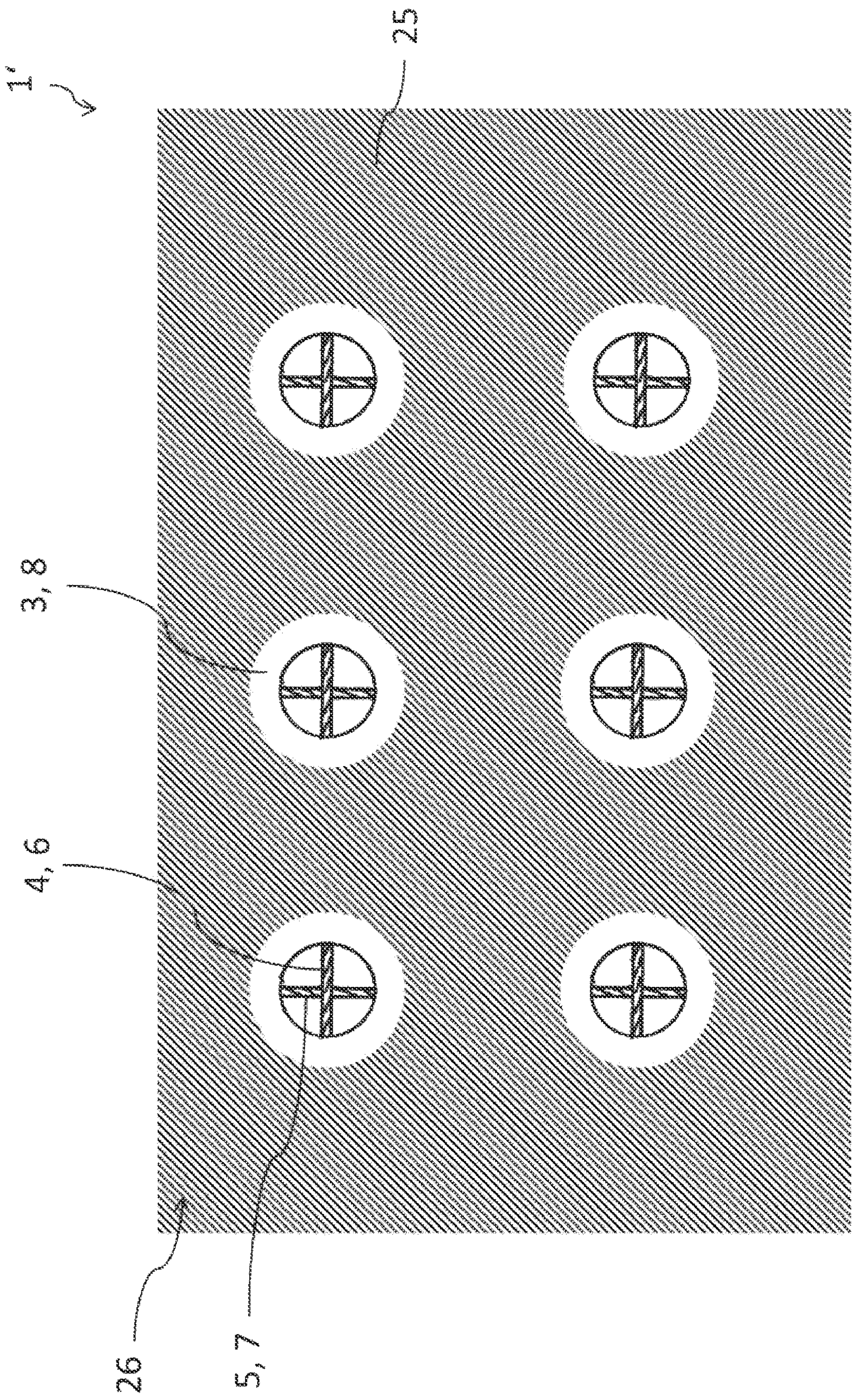
FIG. 3 illustrates a schematic view of another press pad according to the invention.
Figure 4:
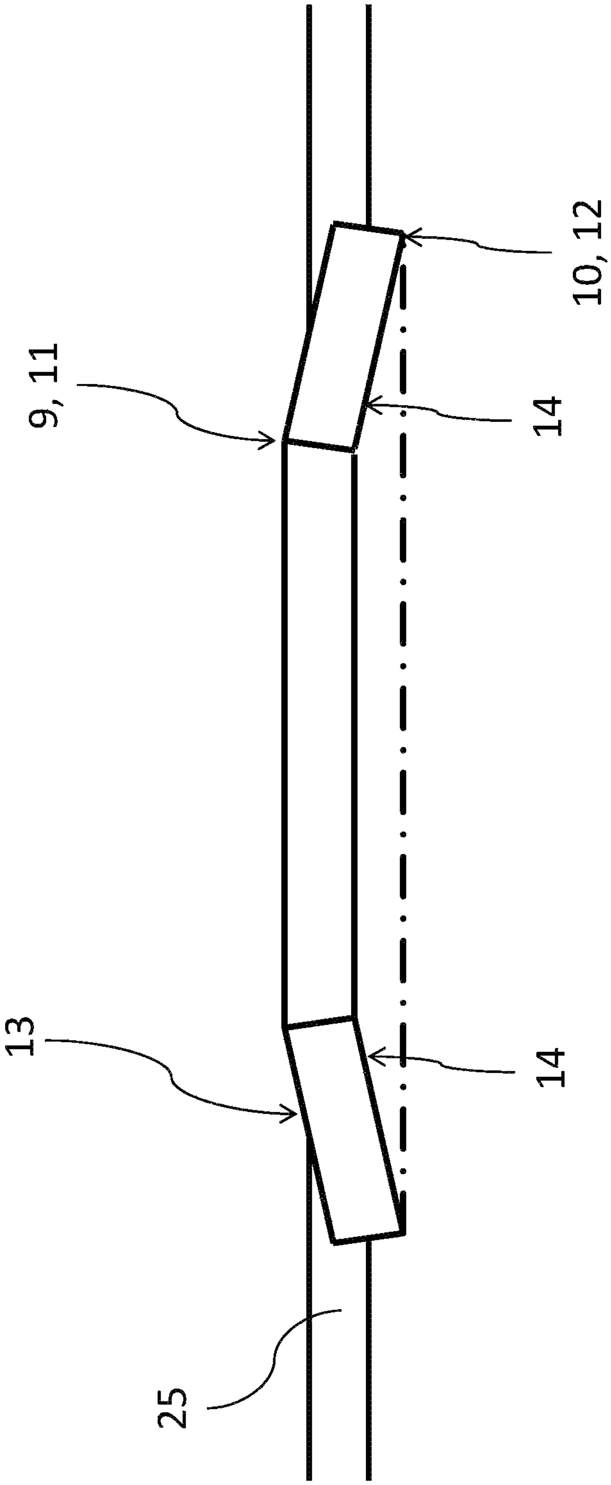
FIG. 4 illustrates a vertical sectional view through the press pad of FIG. 3.

Another advantageous embodiment of the press pad 1' according to the invention is illustrated in FIG. 3. The press pad 1' also includes a flat support structure 2 configured as a fabric and a plurality of metal spring elements 3. Contrary to the press pad 1' illustrated in FIG. 1 the press pad 1' according to FIG. 2 has a coating 25 on both sides that is made from a temperature stable elastomeric material. Thus, the press pad 1' illustrated in FIG. 1 is essentially embedded in the elastomeric material. In order to assure that the contact of the heating plate or the press plate only occurs with the spring elements 3, the coating 25 is removed in a portion of each of the spring elements as evident from FIG. 4. Thus, an upper surface and a lower surface of the press pad 1' is partially formed by the spring elements 3.

Figure 5:
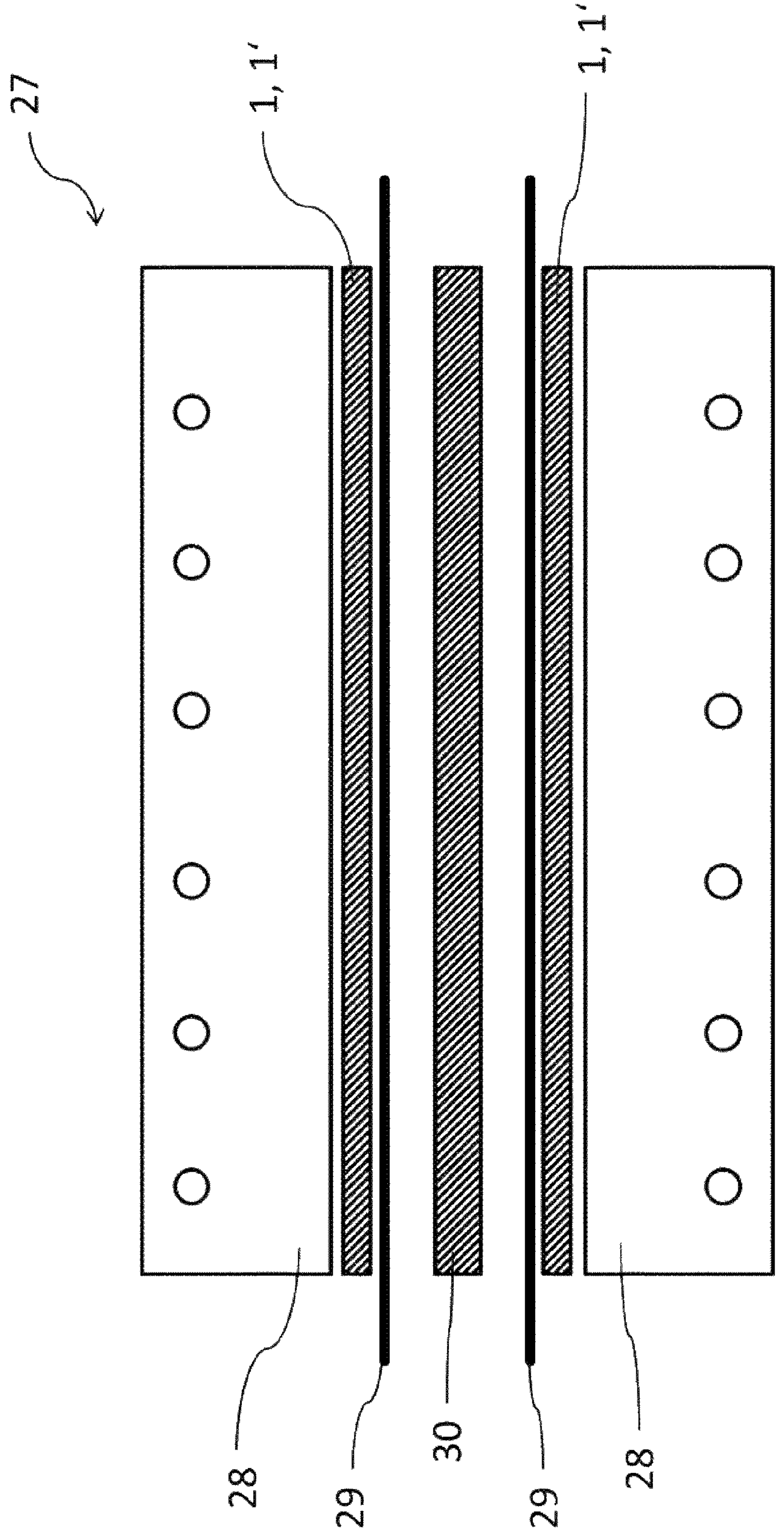
FIG. 5 illustrates a vertical sectional view through a single level hot press according to the prior art.

A single level hot press 27 according to the prior art is illustrated in FIG. 5. The single level hot press 27 includes two heating plates 28 and two press plates 29. According to the instant invention and according to the prior art a respective press pad 1', 1 is arranged between a heating plate 28 and a press plate 29 of the single level hot press 27. A wood material sheet 30 that is to be coated is inserted between the two press plates 29 and covered with a decorative paper that is not illustrated in the drawing figure. The decorative paper is connected with the wood material plate 30 by the heat that is imparted by the single level hot press 27 and by the pressure imparted upon the wood material sheet 30.

Figure 6:
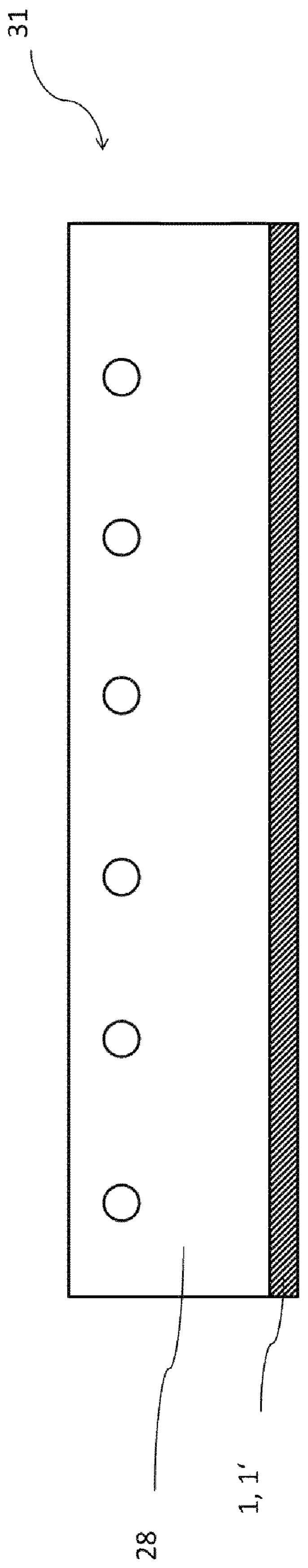
FIG. 6 illustrates a vertical sectional view through a press pad—heating plate unit according to the invention.
Figure 7:
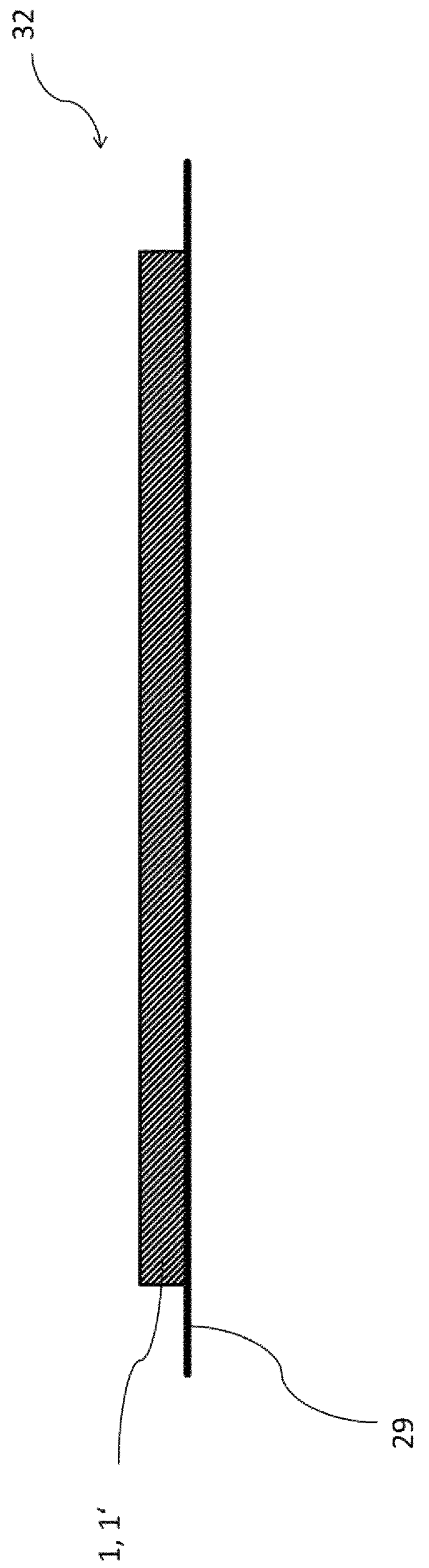
FIG. 7 illustrates a vertical sectional view through a press pad—press plate unit according to the invention.

An embodiment of a press pad—heating plate unit 31 according to the invention that is illustrated in FIG. 6 includes a press pad 1, 1' according to the invention and a heating plate 28 of a single level or multilevel hot press. Thus, the press pad 1, 1' is glued together with the heating plate 28 so that a single component is formed.

FIG. 6 illustrates an embodiment of a press pad heating plate unit 32. Contrary to the press pad-heating plate unit 31 the press pad 1', 1 is not connected with a heating plate 28 but with a press plate 29 of a single or multilevel hot press, e.g. glued together and thus also forms a single component.

REFERENCE NUMERALS AND DESIGNATIONS

1' Press pad
1 Press Pad
2 Support structure
3 Spring element
4 Thread system
5 Thread system
6 Warp thread
7 Weft thread
8 Disc spring
9 Upper edge
10 Lower edge
11 Contact line
12 Contact line
13 Upper contact surface
14 Lower contact surface
15 Side section
16 Edge portion
17 Cut out
18 Intersection point
19 Center axis
20 Diameter
21 Unloaded length
22 Outer diameter
23 Inner diameter
24 Material thickness
25 Coating
26 Surface
27 Single level hot press
28 Heating plate
29 Press plate
30 Wood material sheet
31 Press pad—heating plate unit
32 Press pad—heating plate unit

What is claimed is:

1. A press pad for a hydraulic ingle or multi-level hot press, the press pad comprising:

a flat support structure; and a plurality of metal spring elements connected with the flat support, structure and arranged distributed therein or thereon, wherein the flat support structure is a flat contexture, or a knitted material, or a woven material or a fleece material or a fabric, wherein at least a portion of threads that form the flat contexture is made from metal or includes metal, wherein the metal is brass, or copper, or bronze, steel or stainless steel wherein at least a portion of the threads that form the flat contexture runs through the plurality of the metal spring elements.

2. The press pad according to claim 1, wherein the flat support structure is formed by a metal plate and a flat contexture, and wherein the metal spring elements are connected with the flat contexture or the metal plate.

3. The press pad according to claim 1, wherein the metal spring elements are disc springs or coil springs or leaf springs or corrugated springs.

4. The press pad according to claim 1, wherein the metal spring elements are connected with threads of the flat contexture by form locking, and wherein the metal spring elements are arranged at intersection points of warp threads and weft threads of the flat contexture that run through the metal spring elements and intersect inside the metal spring elements.

5. The press pad according to claim 4, wherein the metal spring elements include cut outs, and wherein the threads of the flat contexture are run through the cut outs.

6. The press pad according to claim 5, wherein the metal spring elements respectively include at least four cut outs, and wherein a respective warp thread is run through two cut outs and a respective weft thread is run through another two cut outs of the at least four cut outs.

7. The press pad according to claim 1, wherein the metal spring elements are arranged equidistant from one another, and wherein the metal spring elements are arranged in intersecting rows along the weft threads and warp the threads.

8. The press pad according to claim 1, wherein the metal spring elements are partially embedded in an elastomeric material, or a silicon elastomeric material or a fluor silicon elastomeric material, or a blend polymer or a copolymer of the silicon elastomeric material and the fluor silicon elastomeric material, wherein the metal spring elements respectively form a portion of a surface of the press pad at opposite sides of the press pad.

9. The press pad according to claim 8, wherein particles that increase heat conductivity or particles made from a metal or a mineral are included in the elastomeric material, and wherein the particles are nano particles.

10. A press pad—press plate unit or a press pad—heating pad unit, comprising the press pad according to claim 1.

* * * * *